United States Patent Office 3,446,517
Patented May 27, 1969

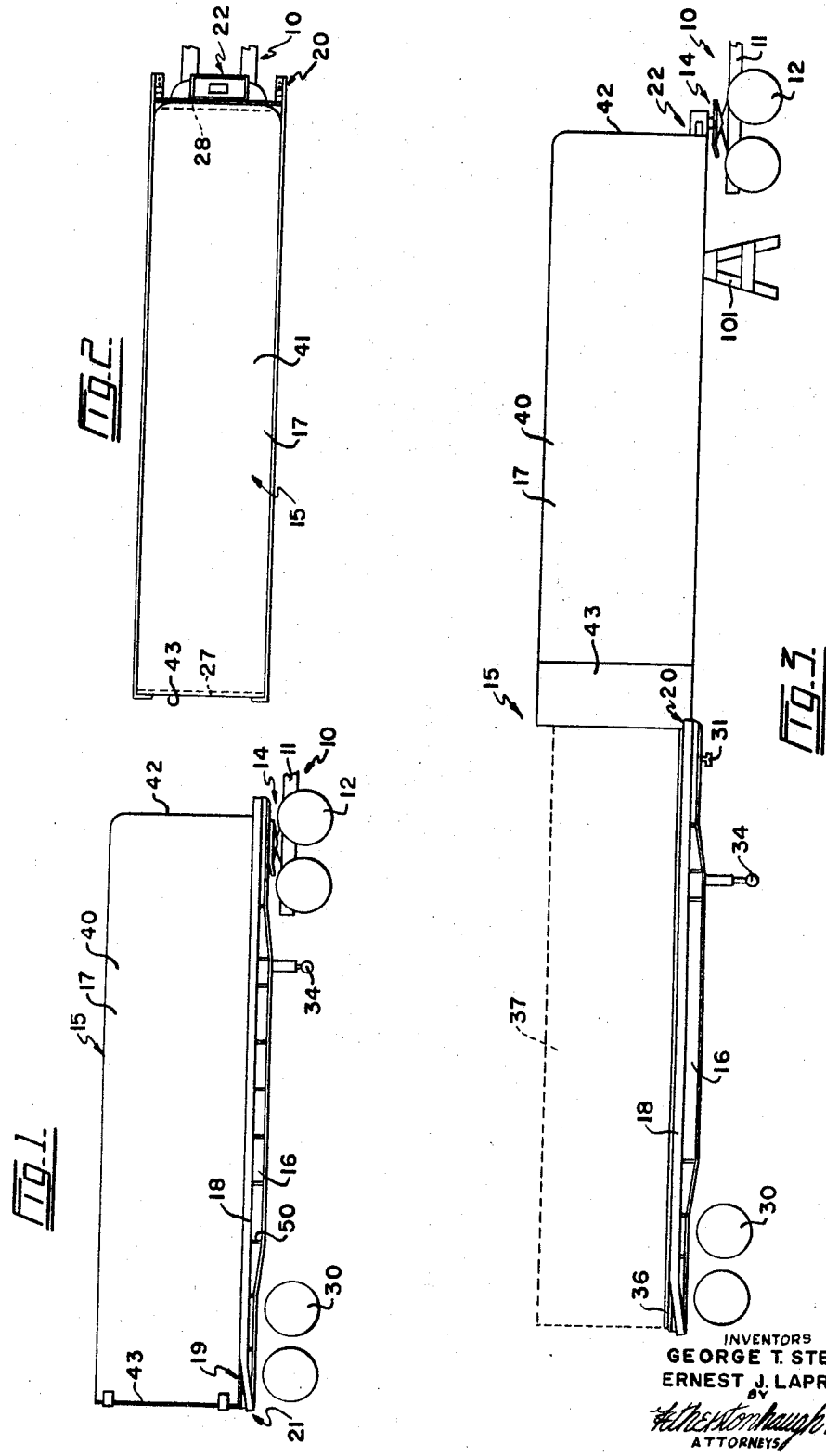

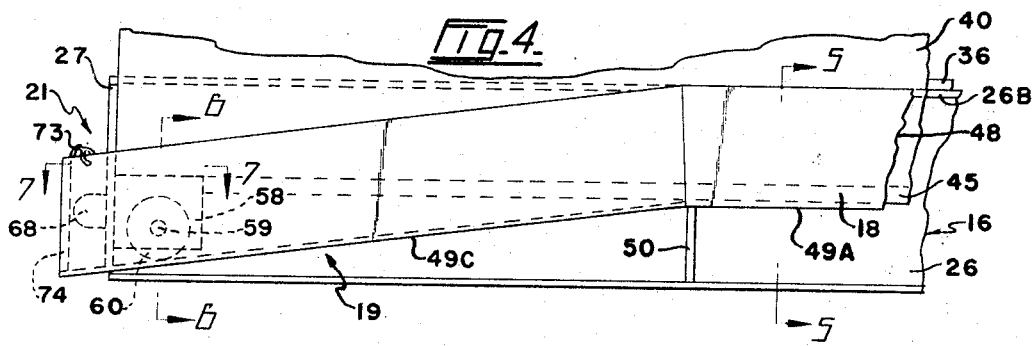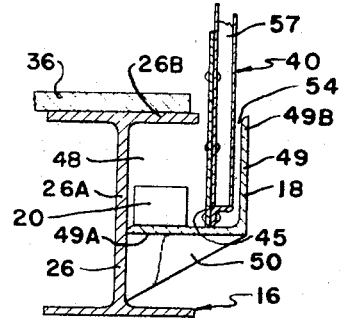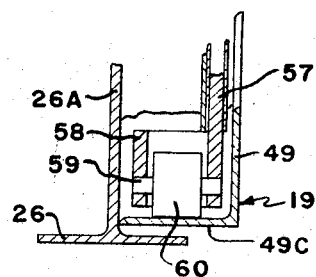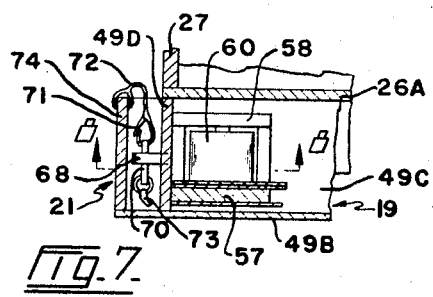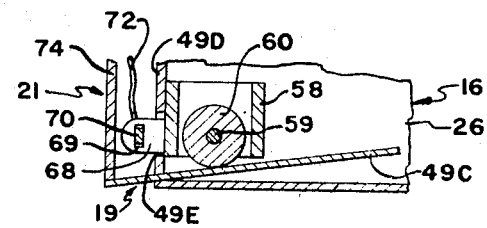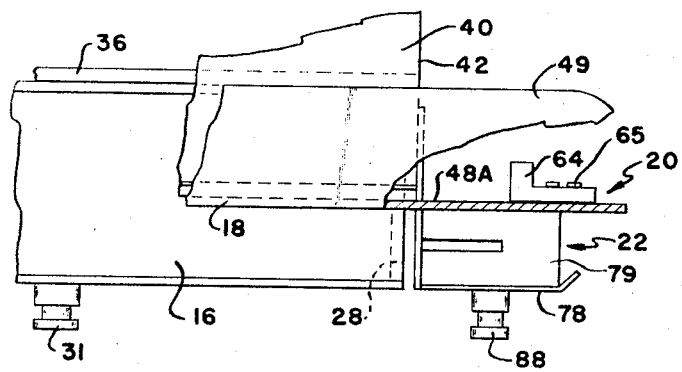

1

3,446,517
FREIGHT VEHICLE WITH A ROLLBACK BODY
George T. Stewart, North Vancouver, British Columbia, and Ernest J. Laprairie, Nanaimo, British Columbia, Canada, assignors to Stewart Laprairie Skinback Trailers Ltd., North Vancouver, British Columbia, Canada
Filed Feb. 7, 1968, Ser. No. 703,692
Int. Cl. B62d 53/06, 27/00; B60p 1/64
U.S. Cl. 280—423
9 Claims

ABSTRACT OF THE DISCLOSURE

A vehicle having a cargo-supporting frame and a body movable longitudinally and independently of both the cargo and the frame.

Background of the invention

This invention relates to freight transporting vehicles and has more particular reference to highway vehicles.

Many of the truck and trailer units in use today are capable of carrying very large loads and one of the problems facing the operators of such units is the task of loading and unloading cargo. In order to reduce labour costs and to ensure a rapid turn around of the vehicle, operators prefer to make maximum use of freight handling equipment such as a crane or a forklift truck. A crane is unsuitable for moving loads off and onto a covered cargo deck of a vehicle. A forklift truck normally is required to enter and leave the vehicle through end doors and even the largest vehicles do not have sufficient room to maneuver such equipment properly. In addition, the cargo must be stored in a manner which will allow this equipment to be used and this sometimes takes up cargo space with a resulting reduction in the pay load which can be carried by the vehicle.

Summary of the invention

The present invention offers a simple and economical solution to the above mentioned problem by providing a novel and improved vehicle having a body which is movable longitudinally of the frame on which it is supported. This movement of the body relative to the frame provides access to the entire area of the vehicle's cargo-supporting deck so that freight can be loaded and unloaded from the side of the vehicle, preferably by use of large forklife trucks or cranes. In the case of a semitrailer, the tractor vehicle for that trailer provides the means for moving the body lengthwise of the frame so that the cargo deck can be covered and uncovered quickly and easily without the need for additional equipment for this purpose. The trailer body is mounted on its supporting frame in such a way that there is no possibility of the body becoming dislodged on the highway or while the body is being moved endwise to load or unload. The body can be locked securely to the frame to prevent the body shifting endwise and coming into contact with the cargo during transit.

Brief description of the drawings

FIGURE 1 is a schematic side elevation of the preferred embodiment of the invention,
FIGURE 2 is a schematic plan view,
FIGURE 3 is a schematic side elevation showing the cover extended to expose the cargo deck,
FIGURE 4 is an elevation of a portion of the trailer showing the lifting means and the locking means,
FIGURE 5 is a vertical section taken on the line 5—5 of FIGURE 4,
FIGURE 6 is a vertical section taken on the line 6—6 of FIGURE 4,

2

Figure 10:
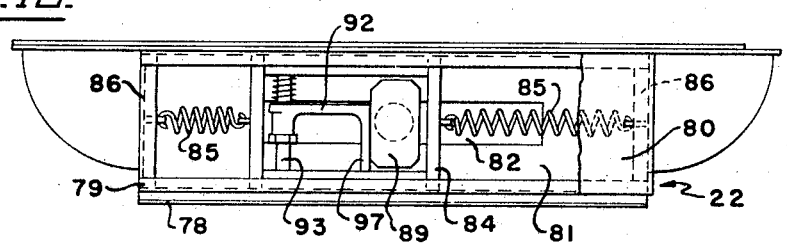
Figure 11:
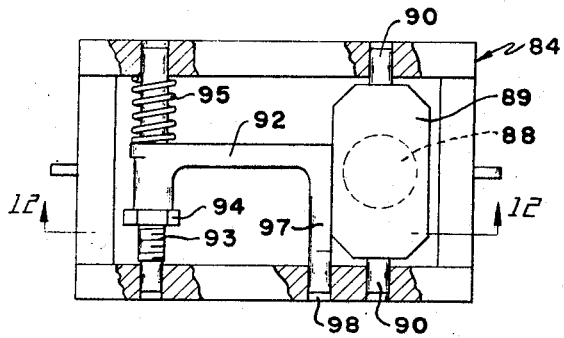
Figure 12:
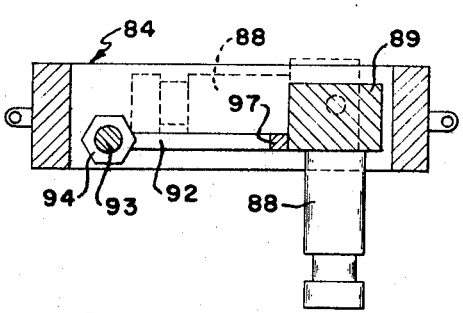

FIGURE 7 is a horizontal section taken on the line 7—7 of FIGURE 4,
FIGURE 8 is a vertical section taken on the line 8—8 of FIGURE 7,
FIGURE 9 is an elevation, part in section, showing the stop means,
FIGURE 10 is a plan view, part broken away, of the connecting means,
FIGURE 11 is an enlarged plan view of the body king pin and associated parts, and
FIGURE 12 is a transverse section taken on the line 12—12 of FIGURE 11.

Description of the preferred embodiments

The numeral 10 indicates generally a typical tractor vehicle of the type commonly used to haul semitrailers as employed in the road transporting of various goods. Tractor 10 includes a frame 11, rear wheels 12, and a conventional fifth wheel mechanism generally indicated at 14.

The freight vehicle with a rollback body, generally indicated at 15, is shown to comprise a frame 16 on which a body 17 is mounted, guide means 18 to permit the body to move longitudinally of the frame, lifting means 19 for raising the body slightly as it is moved endwise, stop means 20 for limiting endwise movement of the body on the frame, locking means 21 for securing the body against movement on the frame, and finally, connecting means 22 for attaching the semitrailer body to the towing vehicle.

The frame which is indicated generally by the numeral 16, will be seen to comprise longitudinally extending side members 26, preferably heavy I-beams which are suitably cross-connected by other members including a rear end member 27 and a front end member 28, both these cross members being shown in FIGURE 2 only. Dual wheels 30 support the rear end of the frame 16 while the front end of the frame rests on the fifth wheel 14. A vertically disposed king pin 31 projects below the centre of the semitrailer frame near the front cross member 28 and this pin normally is engaged by the fifth wheel mechanism 14 to releasably and pivotally secure the trailer 15 to the towing vehicle 10. Spaced a short distance to the rear of the pin 31 is an auxiliary wheel assembly 34 of conventional construction. This assembly is the type which may be raised for highway travel and lowered into contact with the ground to support the front end of the trailer when the vehicle is parked separated from the tractor. Mounted on the side members 26 of the frame, is a floor or deck 36 on which cargo, generally indicated at 37, and shown in dotted line in FIGURE 3 only, is adapted; to be supported.

The body, which is indicated generally at 17, is shown to comprise side walls 40, a roof 41, a front end wall 42, and rear doors 43. Doors 43 are the conventional hinged doors fitted to trailers and are equipped with the usual hardware by which they can be locked in closed position or retained in open position against the side walls 40 of the body. The side walls 40 have lower edges 45, see FIGURE 5.

The guide means, indicated generally at 18, is shown in FIGURES 4 and 5 to comprise side channels 48 which are formed in part by the members 26 and in part by lengths of angle 49, the angles being welded to the longitudinal frame members and reinforced by gussets 50. Thus the channels 48 are defined by horizontal bottom walls or tracks 49A, outer flanges 49B, inner webs 26A and top flanges 26B. The adjoining edges of the flanges 26B and 49B are spaced apart to define slots 54 which extend from end to end of the frame 16. The lower edges 45 of the trailer side walls 40 project through the slots 54 and normally rest upon the tracks 49A.

The lifting means indicated generally at 19 (FIGURES 4, 6 and 8) is shown to comprise ramps 49C which are formed by the downwardly sloping rear ends of the tracks 49A. Near the doors 43, the lower edges of the side walls 40 are fitted with plates 57 which also project through the slots 54 and into the channels 48. Within the channels 48, the vertically disposed plates 57 are provided with box-like brackets 58 which project inwardly. Brackets 58 are fitted with horizontal and transversely extending axles 59 on which rollers 60 are journalled. When the body 17 is closed, or in other words is covering the cargo 37, the lower edges 45 of the body side walls are in contact with the track 49A, at which time the rollers 60 are in contact with the lowermost portions of the ramps 49C. At this time, almost the entire weight of the body is borne by the tracks and very little is supported by the rollers 60. Since the weight of the body is considerable and the bearing surfaces provided by the tracks extend the entire length of the trailer frame, the body is firmly supported against endwise movement as long as the rollers remain in contact with the outer ends of the ramps. The flanges 26B and 49B of the guide channels prevent the body from moving laterally on the frame. Also the brackets 58 are disposed beneath the flanges 26B at all times so that the body connot be lifted vertically of the frame. When the trailer body is pulled forwardly, the rollers 60 ride up the ramps 49C and lift the edges 45 out of contact with the tracks 49A. Thus the lifting means 19 ensures that the body can be rolled forwardly quite easy while at the same time it is held firmly against movement in any other direction.

The stop means shown in FIGURES 5 and 9 and indicated generally at 20 comprises a pair of bumpers 64 which partially block the forward end of the guide channels 48. The length of angles 49 which form part of the guide channels 48 project forwardly of the front cross member 28 and the bumpers 64 are fitted to these forward extensions. Preferably the bumpers 64 are secured to the end of the tracks 49A by means of bolts 65 which permit the bumpers to be removed if it is ever necessary to remove the body 17 completely from the frame 16. When the bumpers 64 are bolted in position and the body 17 is rolled fully forward on the frame to uncover the deck, the brackets 58 contact the bumpers and prevent accidental detachment of the body from the frame.

The locking means indicated generally at 21 and shown in FIGURES 7 and 8, is shown to comprise lugs 68 which are slotted as at 69, the lugs projecting rearwardly from the brackets 58. Flanges 49B of the guide channels 48 are connected by transverse webs 49D to the end cross member 27 of the trailer frame and these webs have openings 49E. When the body 17 is in position to fully cover the load, the lugs 68 project through the openings 49E. Wedge-shaped keeper pins 70 are entered through the slots 69 in the lugs and these keeper pins are held against withdrawal by means of snap rings 71. Preferably, the keeper pin 70 and the snap ring 71 are tied to a suitable part of the structure by cords 72 and 73. The lug 68 and the keeper pin 70 are protected from damage by open ended guards 74. It will be apparent that, when the locking means 21 is in the position described, the body 17 cannot be moved longitudinally of the frame 16.

The connecting means indicated generally at 22, see FIGURES 10, 11 and 12, is shown to comprise a horizontal bracket 78 which projects forwardly from the front cross member 28 of the trailer frame. A flattened housing 79 is supported by the bracket 78, this housing having a top wall 80 and a bottom wall 81 which is provided with a transverse slot 82. Mounted in the housing 80 for transverse sliding movement, is a rectangular frame 84. Springs 85 secure the frame 84 to the end walls 86 of the housing. These springs normally centre the frame 84 slightly to the left of the centre of the housing 79 as viewed in FIGURE 10. Frame 84 is fitted with a king pin 88 which has a base 89. The base 89 is provided with trunnions 90 which are journalled in the frame 84 so that the king pin can swing about a horizontal axis extending longitudinally of the body 17. Frame 84 is also fitted with a latch bar 92 which is rotatably and slidably mounted on a shaft 93. Shaft 93 is supported by the frame slightly below and parallel to the axis of the trunnions 90 and is fitted with a collar 94. A spring 95 urges the bar 92 into contact with the collar 94. The latch bar 92 has a finger 97 which is received in an opening 98 formed in the frame 84. The springs 85 serve to keep the king pin 88 centered with respect to the vehicle frame 16.

When the king pin 88 is not required for use, it is supported within the housing 79 by the latch bar 92. At this time, the latch bar is in the position shown in the drawing and the king pin 88 rests on top of the latch bar within the housing as shown by dotted lines in FIGURE 12. To release the king pin to a position of use, the driver of the tractor-trailer unit reaches through the slot 82 and pushes the latch bar 92 rearwardly to compress the spring 95 and withdraw the finger 97 from the opening 98. This allows the latch bar to swing downwardly about the shaft 93 whereupon the king pin 88 can be dropped into vertical position. The latch bar is then returned to its original position whereupon the finger 97 bears against the base 89 so as to hold the king pin against swinging movement. In this manner, the connecting means 22 is operated to place the king pin in a position to be engaged by the fifth wheel mechanism 14 of the tractor 10.

The tractor-trailer unit is operated to prepare it for loading substantially as follows: The keeper pins 70 are withdrawn from the lugs 69 to unlock the body 17 from the frame 16. Doors 43 are opened and swung back parallel to the trailer side walls, as shown in FIGURE 3. The auxiliary wheel assembly 34 is lowered into contact with the ground. The driver then actuates the fifth wheel mechanism 14 to release its grip upon the king pin 31. He then climbs into the cab of the tractor and moves the hauling vehicle 10 forward a distance sufficient for the mechanism 14 to clear the pin 31 anh the front edge of the housing 79 whereupon he halts the vehicle and returns to the connecting means 22. By entering the fingers of one hand through the slot 82, the driver can operate the latch bar 92 to withdraw the finger 97 from the opening 98 which will permit the latch bar to swing downwardly and release the king pin 88. Pin 88 is then dropped and is locked in vertical position when the latch bar 92 is returned to its original position. Tractor 10 is then backed up until the mechanism 14 engages and locks onto the pin 88. It will be noted that when the weight of the frame 16 is taken off the fifth wheel, the springs of the tractor wheels 12 will raise the fifth wheel slightly. When tractor 10 subsequently is backed to pick up the body 17, the front end of said body is lifted off the tracks 49A.

With the body 17 thus coupled to the tractor 10, the driver moves his vehicle forward slowly to draw the body off the frame 16. Initial forward movement of the body 17 causes the rollers 60 to ride up the ramp 49C whereupon the lower edges 45 of the side walls are raised out of contact with the tracks 49A at the rear end of trailer and approximately the same distance the front end was previously raised by the tractor 10. During the remainder of the forward movement of the body, this cargo-covering structure is supported by the rollers 60 and the fifth wheel mechanism 14 so that it can roll along the tracks 49A without scraping or binding. While rolling the body forward, the driver tries to keep the tractor 10 properly aligned with the frame 16, but should he wander off course slightly, this is compensated for by the connecting means 22. Frame 84 of the means 22 slides back and forth within the housing 79 whenever the two vehicles are disaligned. Thus, neither the king pin 88 nor any of its associated parts are subjected to undue strain when the body is being rolled back. When the brackets 58 come into contact with the bumpers 64, the driver halts the tractor and prepares to load the semitrailer.

The deck 36 is now fully uncovered ready for loading. Conveniently, the cargo 37 is preloaded onto pallets and these loaded pallets are raised by a forklift truck and placed on the deck from the side of the trailer. In this manner, the loading can be done quickly and easily using conventional cargo handling equipment. As each loaded pallet is placed on the deck, care is taken to space the ends of each load slightly inboard of the side edges of the deck so as not to obstruct the body when it is returned to its original position.

If the cargo to be loaded on to the vehicle 15 is pipe, wooden poles or steel bars, it may be convenient to load such material by means of a crane. The deck 36 is first fitted with a number of vertical stakes, not shown, which are positioned slightly inboard of the sides of the deck and suitably spaced therealong. The crane can then lower the poles or the like and pile them up between the stakes without being hampered in any way by the body 40.

To replace the body 17, the tractor 10 is backed up to roll the body along the guide channels 48. As the rollers 60 move off the tracks 49A and down the ramps 49C, the body is lowered so that the edges 45 of the side walls at the rear of the vehicle again are placed on the tracks. Mechanism 14 is operated to release the pin 88 and the tractor is moved forward to clear the said pin and lower the front end of the body 17 and so that the king pin can be swung up into the housing 80 and locked in position by means of the latch bar 32. This moves the pin 88 out of the path of travel of the mechanism 14 whereupon the tractor 10 can be backed up further to allow said mechanism to engage the king pin 31 of the frame 16. The auxiliary wheel assembly 34 is then raised and the doors 43 are closed and the loaded tractor-trailer unit is then ready to be driven to its destination.

At the unloading site, the same procedure is followed to uncover the cargo so that it can be off-loaded from the side of the vehicle if desired.

If it is ever necessary to remove the tractor 10 from the loading or unloading site, a suitable stand 101 (FIGURE 3) is placed beneath the front end of the extended body 17. Such a stand will easily support the weight of the body until the tractor returns to take its normal position beneath the vehicle 15.

We claim:
1. A vehicle comprising a frame having side members, a deck supported between the side members and adapted to support a load, a body including side walls having lower edges, guide channels carried by the side members and including horizontal tracks on which the lower edges normally rest, said horizontal tracks having inclined portions adjacent an end of the frame, said lower edges having depending rollers normally engaging the inclined portions, said body being movable longitudinally of the frame to uncover the load upon the deck, said rollers riding up the inclined portions on to the horizontal tracks to travel therealong and support the lower edges out of contact with said tracks after initial movement of the body to uncover the load.

2. A vehicle as claimed in claim 1, in which said guide channels include spaced members defining a slot through which the lower edges of the side walls project, said spaced members retaining the body against lateral movement on the frame.

3. A vehicle as claimed in claim 2, in which said rollers are journalled on inwardly projecting brackets, some of the spaced members overlapping the brackets to prevent upward movement of the body on the frame.

4. A vehicle as claimed in claim 3, and including bumpers within the guide channels, said bumpers being engaged by the inwardly projecting brackets when the body has fully uncovered the load.

5. A vehicle as claimed in claim 1, and including a rear member on the frame, said rear member having an opening, a rearwardly projecting lug on the body to project through the opening, said lug having a transverse slot, and a keeper pin insertable through the slot to lock the body to the frame.

6. A semitrailer vehicle comprising a frame having side members, a load-supporting deck mounted on the side members, said frame has a king pin adapted to be engaged by the fifth wheel mechanism of a tractor vehicle, guide means carried by the side members and extending longitudinally thereof, a body including side walls normally enclosing the load, said side walls having lower edges engaging the guide means, a king pin mounted on the body adjacent the frame king pin for swinging movement about an axis extending longitudinally of said body, said body king pin being engageable by the fifth wheel mechanism whereby the body can be moved endwise by the tractor vheicle to uncover the load-supporting deck.

7. A semitrailer vehicle as claimed in claim 6, and including a housing mounted on the body, a frame mounted in the housing for sliding movement transversely of the body, said body king pin being mounted in the housing frame, and latch means for releasably securing the body king pin in an inoperative position within the housing.

8. A semitrailer vehicle as claimed in claim 7, in which said latch means supports the body king pin against swinging movement about said axis when said body king pin is in a vertical position to be engaged by the fifth wheel mechanism.

9. A semitrailer vehicle as claimed in claim 7, and including spring means biasing the housing frame to dispose the body king pin centrally of the vehicle frame.

References Cited

UNITED STATES PATENTS

| | | | |
|---|---|---|---|
| 2,048,580 | 7/1936 | Webber | 296—28.2 |
| 2,667,379 | 1/1954 | Baze | 296—102 |
| 2,674,208 | 4/1954 | Keller et al. | 105—377 |
| 3,098,456 | 7/1963 | Elsner | 296—137 |

LEO FRIAGLIA, *Primary Examiner.*
JOHN A. PEKAR, *Assistant Examiner.*